(12) United States Patent
Mohanty et al.

(10) Patent No.: US 8,331,632 B1
(45) Date of Patent: Dec. 11, 2012

(54) INDEXING FACE TEMPLATES USING LINEAR MODELS

(75) Inventors: Pranab Mohanty, Tampa, FL (US); Sudeep Sarkar, Tampa, FL (US); Rangachar Kasturi, Tampa, FL (US); P. Jonathon Phillips, Bethesda, MD (US)

(73) Assignees: University of South Florida, Tampa, FL (US); The United States of America, as represented by the Secretary of the Department of Commerce, the National Institute of Standards and Technology, Washington, DC (US)

( * ) Notice: Subject to any disclaimer, the term of this patent is extended or adjusted under 35 U.S.C. 154(b) by 950 days.

(21) Appl. No.: 12/371,099

(22) Filed: Feb. 13, 2009

Related U.S. Application Data

(63) Continuation-in-part of application No. 12/187,028, filed on Aug. 6, 2008, now Pat. No. 8,165,352.

(60) Provisional application No. 61/065,581, filed on Feb. 13, 2008, provisional application No. 60/954,187, filed on Aug. 6, 2007.

(51) Int. Cl.
*G06K 9/00* (2006.01)
*G06K 9/62* (2006.01)

(52) U.S. Cl. ........ 382/118; 382/115; 382/117; 382/155; 382/159; 382/160; 726/25

(58) Field of Classification Search .................. 382/118, 382/115, 117, 155, 159, 160; 726/25
See application file for complete search history.

(56) References Cited

U.S. PATENT DOCUMENTS

| | | | |
|---|---|---|---|
| 6,292,575 B1 | 9/2001 | Bortolussi et al. |
| 6,301,370 B1 | 10/2001 | Steffens et al. |
| 6,556,196 B1 | 4/2003 | Blanz et al. |
| 6,681,032 B2 | 1/2004 | Bortolussi et al. |
| 6,853,739 B2 | 2/2005 | Kyle |
| 6,920,231 B1 | 7/2005 | Griffin |
| 7,054,468 B2 | 5/2006 | Yang |
| 7,127,087 B2 | 10/2006 | Huang et al. |
| 7,139,738 B2 | 11/2006 | Philomin et al. |

OTHER PUBLICATIONS

Turk, et al. "Eigenface for Recognition." Journal of Cognitive Neuroscience. 3.1 (1991): 71-86. Print.*
Beveridge, Ross. "Linear and Generalized Linear Models for Analyzing Face Recognition Performance." Biometric Quality Workshop. Colorado State University. Mar. 9, 2006. Lecture.*

(Continued)

*Primary Examiner* — Michael A Newman
(74) *Attorney, Agent, or Firm* — Molly L. Sauter; Smith & Hopen, P.A.

(57) ABSTRACT

A novel, linear modeling method to model a face recognition algorithm based on the match scores produced by the algorithm. Starting with a distance matrix representing the pair-wise match scores between face images, an iterative stress minimization algorithm is used to obtain an embedding of the distance matrix in a low-dimensional space. A linear transformation used to project new face images into the model space is divided into two sub-transformations: a rigid transformation of face images obtained through principal component analysis of face images and a non-rigid transformation responsible for preserving pair-wise distance relationships between face images. Also provided is a linear indexing method using the linear modeling method to perform the binning or algorithm-specific indexing task with little overhead.

5 Claims, 9 Drawing Sheets

OTHER PUBLICATIONS

Shin, et al. "Performance Evaluation Model for the Face Recognition System." Frontiers in the Convergence of Bioscience and Information Technologies, IEEE. (2007): 704-708. Print.*

Mohanty, et al. "A Non-Iterative Approach to Reconstruct Face Templates from Match Scores." ICPR '06 Proceedings of the 18th International Conference on Pattern Recognition. (2006): 1-4. Print.*

Mohanty, et al. "Privacy & Security Issues Related to Match Scores." CVPRW '06 Proceedings of the 2006 Conference on Computer Vision and Pattern Recognition Workshop. (2006): 1-4. Print.*

De la Torre, et al. "Multimodal Oriented Discriminant Analysis" (2005). Robotics Institute. Paper 129. http://repository.cmu.edu/robotics/129.*

Laurenz Wiskott, Jean-Marc Fellous, Norbert Kruger, Christoph Von Der Malsburg. "Face Recognition by Elastic Bunch Graph Matching." IEEE. Pattern Analysis and Machine Intelligence. Jul. 1997. vol. 19. No. 7. pp. 775-779.

Phillips, P.J.; Hyeonjoon Moon; Rizvi, S.A.; Rauss, P.J. "The FERET Evaluation Methodology for Face-Recognition Algorithms." Transactions on Pattern Analysis and Machine Intelligence. IEEE. Oct. 2000. vol. 22. No. 10. pp. 1090-1104.

Juewi Lu.; Platanoitis, K.N.; Venetsanopoulos, A.N. "Face Recognition Using LDA-based Algorithms." Transactions on Neural Networks. IEEE. Jan. 2003 vol. 14. No. 1. pp. 195-200.

Xiaofei He, Shuicheng Yan, Yuxiao Hu, Partha Niyogi, Hong-Jiang Zhang. "Face Recognition Using Laplacianfaces." Transactions on Pattern Analysis and Macnine Intelligence. IEEE. Mar. 2005. vol. 27. No. 3. pp. 328-340.

Chang, K.I.; Bowyer, K.W.; Flynn, P.J. "An Evaluation of Multimodal 2D and 3D Face Biometrics." IEEE. Transactions on Pattern Analysis and Machine Intelligence. vol. 27. No. 4. Apr. 2005. pp. 619-624.

Shang-Hung Lin, Sun-Yuan Kung, Long-Ji Lin. "Face Recognition/Detection by Probabilistic Decision-Based Neural Network." Transactions on Neural Networks. IEEE. Jan. 1997. vol. 8. No. 1. pp. 114-132.

Kyong Chang, Kevin Bowyer, Sudeep Sarkar and Barnabas Victor. "Comparison and Combination of Ear and Face Images in Appearance-Based Biometrics." IEEE. Transactions on Pattern Analysis and Machine Intelligence. Sep. 2003. vol. 25. No. 9. pp. 1160-1165.

Kotropoulos, C., Tefas, A., Pitas, I. "Frontal Face Authentication Using Morphological Elastic Graphmatching." Image Processing. IEEE. Apr. 2000. vol. 9. No. 4. pp. 555-560.

Mohanty, P.K.; Sarkar, S.; Kasturi, R. "Designing Affine Transformations-based Face Recognition Algorithms." Computer Vision and Pattern Recognition, 2005. IEEE. vol. No. 25. Jun. 25, 2005. pp. 173.

* cited by examiner

| Algorithm | Measure | Similarity/Dissimilarity | Range of Scores | Transformation |
|---|---|---|---|---|
| PCA | Cosine distance in Mahalanobis Space | Dissimilarity | -1 to 1 | $1 + d_{ij}$ |
| LDA | Euclidean | Dissimilarity | 0 to ∞ | none |
| ICA | Cosine angle in Mahalanobis Space | Dissimilarity | -1 to 1 | $1 + d_{ij}$ |
| BAY | Probability of IntraExtra Class of the template | Dissimilarity | 0 to ∞ | none |
| EBGM | Face Graph Narrowing Local Search | Dissimilarity | -1 to 0 | $-\log(-d_{ij})$ |
| PRP | Unknown | Similarity | a to b | $b - d_{ij}$ |

FIG. 7

| Algorithm | algo-train | model-train [a] | Test Sets |
|---|---|---|---|
| PCA | 600 images (FRGC train set) | 600 images (FRGC train set) | FERET Probe Sets |
| LDA | 600 images (FRGC train set) | 600 images (FRGC train set) | FERET Probe Sets |
| ICA | 600 images (FRGC train set) | 600 images (FRGC train set) | FERET Probe Sets |
| BAY | 600 images (FRGC train set) | 600 images (FRGC train set) | FERET Probe Sets |
| EBGM | 493 images (FERET train set) | 493 images (FERET train set) | FERET Probe Sets |
| PRP | Unknown | 600 images (FRGC train set) | FERET Probe Sets |
| PRP | Unknown | 493 images (FERET train set) | FERET Probe Sets |
| PRP | Unknown | 2864 images (FRGC train set) | FRGC Exp1, Exp2, Exp4 |

[a] There are no common images in the algo-train set and the model-train set for PCA, LDA, ICA, and BAY algorithm (see text)

FIG. 8

| Distance Measure | False Acceptance Rate (%) | | |
|---|---|---|---|
| | 0.001 | 0.01 | 0.1 |
| CityBlock | 0.022 | 0.018 | 0.007 |
| Euclidean | 0.003 | 0.0001 | 0.0001 |
| Correlation | 0.004 | 0.015 | 0.0005 |
| Covariation | 0.003 | 0.016 | 0.0002 |
| L1 Norm | 0.024 | 0.003 | 0.005 |

| Algorithm | Error in Indexing | | | |
|---|---|---|---|---|
| | 0.1 | 0.01 | 0.001 | 0.0001 |
| BAY | 1 (5) | 5 (19) | 16 (27) | 16 (35) |
| EBGM | 7 (11) | 38 (43) | 99 (70) | 99 (70) |
| PRP | 5 (21) | 18 (75) | 22 (127) | 22 (127) |

*FIG. 11A*

| Algorithm | Error in Indexing | | | |
|---|---|---|---|---|
| | 0.1 | 0.01 | 0.001 | 0.0001 |
| BAY | 1 (5) | 1 (5) | 1 (9) | 8 (13) |
| EBGM | 1 (5) | 15 (15) | 20 (22) | 20 (22) |
| PRP | 1 (5) | 22 (38) | 22 (50) | 26 (50) |

*FIG. 11B*

| Algorithm | Error in Indexing | | | |
|---|---|---|---|---|
| | 0.1 | 0.01 | 0.001 | 0.0001 |
| BAY | 1 (5) | 2 (10) | 13 (18) | 13 (75) |
| EBGM | 1 (5) | 15 (57) | 23 (125) | 23 (128) |
| PRP | 3 (5) | 117 (127) | 345 (481) | 498 (498) |

*FIG. 12A*

| Algorithm | Error in Indexing | | | |
|---|---|---|---|---|
| | 0.1 | 0.01 | 0.001 | 0.0001 |
| BAY | 1 (5) | 1 (7) | 1 (12) | 1 (12) |
| EBGM | 1 (5) | 9 (15) | 43 (43) | 48 (48) |
| PRP | 1 (5) | 18 (22) | 46 (46) | 50 (50) |

*FIG. 12B*

INDEXING FACE TEMPLATES USING LINEAR MODELS

CROSS REFERENCE TO RELATED APPLICATIONS

This application is a Continuation-in-Part of co-pending U.S. patent application Ser. No. 12/187,028, filed Aug. 6, 2008; which claims priority to U.S. Provisional Patent Application 60/954,187, filed Aug. 6, 2007; and this application claims priority to currently pending U.S. Provisional Patent Application No. 61/065,581, filed Feb. 13, 2008.

STATEMENT OF GOVERNMENT INTEREST

This invention was made with Government support under Grant No. DCA200-02-D-5014 awarded by the Department of Homeland Security. The Government has certain rights in the invention.

FIELD OF INVENTION

This invention relates to biometric recognition systems; more specifically, a method of indexing face templates using linear models.

BACKGROUND

Biometric technologies have become an integral part of many secure access systems. Biometric-based authentication systems are being deployed in both low-risk secure systems, such as laptops and cell phones, and to relatively high-risk secure systems such as military bases and airports. The use of biometric technologies has a number of advantages over password or smartcard-based technologies, such as user convenience, high security, and less fraud. However, like many other authentication technologies, biometric-based systems are also vulnerable to security breaches. The cost of replacing a biometric token or template is higher to that of a password or a smart card, with severe security and privacy implications. The templates can be reused over digital networks or can be used to reproduce synthetic biometric templates such as fake fingers or model faces. In the case of face templates, there is an additional risk that the identity of a person using a biometric access system in a highly secure facility can be revealed. Several sources of security breaches in biometric-based authentication systems have been found. Some countermeasures have also been proposed to nullify such threats and the standardized biometric application programming interface (BioAPI) is continuously updated with countermeasure guidelines such as encrypting templates, avoiding storage and transmission of original templates, and performing quantization of match scores.

In general, most biometric authentication systems have four major modules: a biometric template acquisition sensor, a matching module to compare a new template to an enrolled template, a decision module using predefined thresholds for particular operational points, and a database for enrolled templates (template gallery). In many applications, it is not possible to integrate all these modules into one unit. In such scenarios, the information is passed from one unit to the other through digital channels and/or stored in digital media for offline processing. Each module possesses different levels of security threats, and different countermeasures are necessary to nullify such threats. For instance, 'aliveness' detection at the sensor unit will detect any attempts to hack the system with synthetic templates. Similarly, a secure database or a secure digital channel will prevent any unauthorized access to templates over a network. In applications, where the matching module and decision module are not integrated together, the 'match scores' must be stored in a digital media or transmitted through a digital channel to a decision module. Security breaches resulting from attacks on match scores can occur in distributed network cluster biometric systems with a central decision unit. Such networks are common in wide-area monitoring contexts.

The dominant approach for a match score-based attack on a biometric system is based on hill climbing. C. Soutar was the first to propose an iterative template adaptation method, popularly known as the hill climbing attack, to break into a biometric system based on match scores. *Biometric System Security*, Secure, vol. 5, p. 46-49 (2002). As shown in FIG. 1, hill-climbing approach 1 attacks the account of a subject, referred to as the targeted subject, by starting from arbitrary face template 2 and iteratively refining it in operation 3. Face recognition system (FRS) 15 outputs match score 4, which is the distance between arbitrary face template 2 and target subject 41. At every iteration, if the modified template results in a better score than the previous match score in operation 7, then the modified template is retained in operation 9, or else, it is discarded and the prior template is modified again in operation 8. The process is iterated until the template is accepted as the targeted subject in operation 6. With this method, a break-in may be achieved using a final template that does not look like any real face, as long as it deceives the system. In other words, it is not a face reconstruction method but just a break-in strategy.

One countermeasure for the first generation of hill climbing approaches is to quantize the match scores. In this approach, the FRS outputs match scores, but does not alter the match scores with small changes in input images. With appropriate quantization, it is not possible to get the incremental feedback needed by these approaches. Therefore, A. Adler developed a modified hill climbing attack for a face recognition system with quantized match scores using an additional independent set of eigenfaces. *Images Can Be Regenerated from Quantized Biometric Match Score Data*, Proc. Canadian Conf. Electrical and Computer Eng., p. 469-472 (May 2004). In Adler's modification, after initializing the process with an arbitrary face template, at every iteration, the previously updated template is multiplied with randomly selected eigenfaces having different weights. This generates templates farther away from the previous template. The face template that results in a better match score is retained as the updated image for the next iteration. The process terminates when there is no further improvement in match scores. Experimental results on a commercial face recognition algorithm show that after nearly 4,000 attempts, a high match score is achieved with 99% confidence. Later, Adler extended this idea to work with encrypted face templates. *Vulnerabilities in Biometric Encryption System*, Proc. Int'l Conf. Audio and Video-Based Biometric Person Authentication, p. 1100-1109 (July 2005).

Security breaches are possible not only in face biometrics but in other biometric applications also. U. Uludag and A. Jain extended the hill climbing approach to break into minutiae-based fingerprint recognition system. *Attacks on Biometric Systems: A Case Study in Fingerprints*, Proc. SPIE-EI 2004, Security, Steganography and Watermarking of Multimedia Contents, p. 622-633 (January 2004).

Although hill climbing-based attacks can successfully break a particular targeted account, effective countermeasures for such attacks can also be created. One property of hill climbing-based attacks is that they require a large number of attempts before success. Therefore, one possible countermeasure for such attacks is to restrict the number of consecutive, unsuccessful attempts. However, this still leaves the system vulnerable to a spyware-based attack that interlaces its false attempts with attempts by genuine users (successful attempts) and collects information to iterate over a period of time. However, in most hill climbing-based attacks, the templates at the ith attempt (iteration) are generated from the (i−1)th attempts (iterations) and are similar to each other. Therefore, if all unsuccessful attempts for a particular targeted account within a fixed time interval are monitored, a pattern of similar faces with decreasing dissimilarity scores will be found. Therefore, a continuous observation of unsuccessful match scores will help to detect hill climbing-based spyware attacks.

Multidimensional Scaling (MDS) has been used to derive models for standard classifiers such as nearest neighborhood, linear discriminant analysis, and linear programming problem from the dissimilarity scores between objects. E. Pekalska, P. Paclik, and R. P. W. Duin, "A generalized kernel approach to dissimilarity based classification," *Journal of Machine Learning Research*, vol. 2, pp. 175-211 (2001). A similar framework has also been suggested, where pair-wise distance information is embedded in the Euclidean space, and an equivalence is drawn between several clustering approaches with similar distance-based learning approaches. V. Roth, J. Laub, M. Kawanabe, and J. M. Buhmann, "Optimal cluster preserving embedding of non-metric proximity data," *IEEE Transactions on Pattern Analysis and Machine Intelligence*, vol. 25, no. 12, pp. 1540-1551 (2003). There are also studies that statistically model similarity scores so as to predict the performance of the algorithm on large data sets based on results on small data sets [20]-[23]. P. Wang, Q. Ji, and J. L. Wayman, "Modeling and predicting face recognition system performance based on analysis of similarity scores," *IEEE Transactions on Pattern Analysis and Machine Intelligence*, vol. 29, no. 4, pp. 665-670 (2007); S. Mitra, M. Savvides, and A. Brockwell, "Statistical performance evaluation of biometric authentication systems using random effects models," *IEEE Transactions on Pattern Analysis and Machine Intelligence*, vol. 29, no. 4, pp. 517-530 (2007); R. Wang and B. Bhanu, "Learning models for predicting recognition performance," *IEEE International Conference on Computer Vision (ICCV)*, pp. 1613-1618 (2005); and G. H. Givens, J. R. Beveridge, B. A. Draper, and P J Phillips, "Repeated measures glmm estimation of subject-related and false positive threshold effects on human face verification performance," *IEEE Conference on Computer Vision and Pattern Recognition-Workshops* p. 40 (2005). For instance, Grother and Phillips proposed a joint density function to independently predict match scores and non-match scores from a set of match scores. P. Grother and P. J. Phillips, "Models of large population recognition performance," In *Proc. of IEEE Computer Society Conference on Computer Vision and Pattern Recognition*, pp. 68-75 (2004). Apart from face recognition, methods have been proposed to model and predict performances for other biometric modalities and objects recognition. M. Boshra and B. Bhanu, "Predicting performance of object recognition," *IEEE Transactions on Pattern Analysis and Machine Intelligence*, vol. 22, no. 9, pp. 956-969 (2000) and D. J. Litman, J. B. Hirschberg, and M. Swerts, "Predicting automatic speech recognition performance using prosodic cues," *First conference on North American chapter of the Association for Computational Linguistics*, pp. 218-225 (2000).

Recently, a method of modeling a face recognition algorithm using an affine transform was developed. P. Mohanty, S. Sarkar, and R. Kasturi, *Designing Affine Transformations Based Face Recognition Algorithms*, Proc. IEEE Workshop Face Recognition Challenge (June 2005). Starting from distances computed by any face recognition algorithm, such as the Face Recognition Grand Challenge (FRGC) baseline algorithm, the modeling process calculates the best affine transform that approximates it. The modeling process is a closed-form solution based on classical Multidimensional Scaling (MDS).

Attempts to find vulnerabilities have focused on modifications of the hill-climbing technique; however, these techniques have become identifiable by recognition systems as attacks because of their iterative nature. Discovery of vulnerabilities in recognition systems, therefore, needed to be expanded beyond variations of the hill-climbing technique, in order for countermeasures to be designed to further prevent security breaches resulting from a recognition system's vulnerabilities. Although a process of modeling a face recognition algorithm was available, the process needed modification and improvement to better model the FRS and a method was needed to utilize the improved modeling process to identify vulnerabilities in face recognition systems.

To meet this need, a non-iterative method of reconstructing unknown image templates of biometric systems using match scores was developed. P. Mohanty, S. Sarkar, and R. Kasturi, *From Scores to Face Templates: A Model-Based Approach*, IEEE Transactions on Pattern Analysis and Machine Intelligence, Vol. 29, No. 12 (December 2007). The non-iterative method is the subject of U.S. patent application Ser. No. 12/187,028, which is herein incorporated by reference. This method provides a way of reconstructing biometric image templates using the match scores of distinct images from a face recognition system (FRS). When the reconstruction method 'breaks in' to a FRS, it creates no obvious patterns in the match scores, preventing detection by the FRS. Known countermeasures are not effective in preventing security breaches caused by the method, and new countermeasures will be difficult to design because of the absence of an obvious pattern in the match scores.

FIG. 2 is a schematic of the search process illustrating the differences between hill climbing attack 1 and reconstruction method 10. Reconstruction method 10 requires the distances, or match scores, between the image of targeted subject 9 and a set of distinct images from break-in set 17A-17D. Whereas, a hill climbing-based attack computes scores for faces along a trajectory of incremental scores from arbitrary template 2 to that of targeted subject 9. The statistically decreasing dissimilarity scores generated by a hill climbing-based approach can be used to detect such attacks, but such detection strategies cannot be applied to reconstruction method 10. Hill climbing attack 1 is a 'break-in' strategy to a FRS, whereas reconstruction method 10 is a template reconstruction method. In addition, attacks on an FRS are more feasible in real-time applications by reconstruction method 10, because the number of attempts is predefined by the number of images in the break-in set, instead of potentially unlimited, as in hill climbing attack 1.

A simplified diagram of reconstruction method 10 is shown in FIG. 3. A set of face images different from the gallery and probe sets is used as 'break-in' set 17. Modeling process 20 creates a model of FRS's 15 face recognition algorithm. FRS 15 is treated as a complete black box and no reverse engineering is performed on it. Instead, an assumption is made as to the type of face recognition algorithm used by FRS 15. It may be possible to identify the recognition algorithm given score matrices of known algorithms, but this is not necessary for the success of reconstruction method 10.

Modeling process 20 is an offline procedure and needs to be constructed only once for a given recognition algorithm.

Once the model is built, templates are presented from break-in set 17 to FRS 15, which calculates match scores 46 to unknown target template 41. Unknown target template 41 represents an enrolled template in the FRS, which when reconstructed results in a successful 'break-in'. Embedding process 40 then uses match scores 46 to embed unknown target template 41 in the model. Finally, template construction process 60 manipulates the model to construct unknown target template 41.

Although this process of modeling a face recognition algorithm was available, the process needed modification and improvement to more efficiently model the FRS.

SUMMARY OF INVENTION

The present invention includes a two-fold method of building linear models of an unknown face recognition algorithm. This two-fold modeling method is an improvement over the single pass approach adopted in the prior modeling process. In an embodiment, the method comprises providing a training set (X) comprising a plurality of face images; providing a score matrix (D) containing the scores between pairs of the plurality of face images of the training set; converting the score matrix (D) to an equivalent Euclidean matrix ($D_E$); using stress minimization with iterative majorization to determine a set of coordinates for the training set from the equivalent Euclidean matrix ($D_E$). A score between a pairs of face images is the distance between the pair of the face images. The scores are produced by the unknown face recognition algorithm. The iterative majorization may be initialized by classical multidimensional scaling.

In another embodiment, the method comprises providing an unknown face recognition algorithm, a training set (X) comprising a plurality of face images, and a score matrix (D) containing the scores between pairs of the plurality of face images; determining if the score matrix (D) is Euclidean; computing the optimal configuration points (Y) from the score matrix (D) using classical multidimensional scaling responsive to the score matrix (D) being Euclidean; converting the score matrix (D) to an equivalent Euclidean matrix ($D_E$) responsive to the score matrix (D) being non-Euclidean; and computing optimal configuration points (Y) from the distances contained in the equivalent Euclidean matrix ($D_E$) using the initial configuration point ($Y^{(o)}$) and stress minimization with iterative majorization responsive to the creation of an equivalent Euclidean matrix ($D_E$), wherein the initial configuration point ($Y^{(o)}$) is computed from the equivalent Euclidean matrix ($D_E$) using classical multidimensional scaling. A score between a pairs of face images is the distance between the pair of the face images. The scores are produced by the unknown face recognition algorithm.

The present invention also includes a novel indexing mechanism for face templates that results in a reduction in face template comparisons in a face recognition system. The face recognition system contains a face recognition algorithm and a plurality of gallery images. In an embodiment, the method comprises determining a linear model of the recognition system; providing a probe face image; projecting the probe face image into the linear model space; and determining the nearest gallery images. In a another embodiment, the method further comprises comparing the nearest gallery images with the probe face image using the recognition algorithm; and outputting the nearest gallery image to the probe face image.

BRIEF DESCRIPTION OF THE DRAWINGS

For a fuller understanding of the invention, reference should be made to the following detailed description, taken in connection with the accompanying drawings, in which:

FIG. 7 is a table showing the similarity/dissimilarity measures of different face recognition algorithms FIG. 8 is a table summarizing the train and test sets.

FIG. 11A is an indexing error table showing the value of k at three different indexing error rates for Rank 1 (Rank 5) identification rate on the FERET dup1 (722 subjects) probe set using PCA projection.

FIG. 11B is an indexing error table showing the value of k at three different indexing error rates for Rank 1 (Rank 5) identification rate on the FERET dup1 (722 subjects) probe set using the linear model.

FIG. 12A is an indexing error table showing the value of k at three different indexing error rates for Rank 1 (Rank 5) identification rate on the FERET fafb (1195 subjects) probe set using PCA projection.

FIG. 12B is an indexing error table showing the value of k at three different indexing error rates for Rank 1 (Rank 5) identification rate on the FERET fafb (1195 subjects) probe set using the linear model.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Intensive research has produced a diverse set of approaches for face recognition. The approaches differ in terms of the features used, distance measures used, need for training, and matching methods. Systematic and regular evaluations, such as the FERET (Facial Recognition Technology), the FRGC (Face Recognition Grand Challenge), and Face Recognition Vendor Test, have provided the ability to identify the top performing approaches. In general, a face recognition algorithm is a module that computes distance (or similarity) between two face images. These distances (or similarities) are also referred to as match scores.

Previous works try to statistically model the match scores. The present method, in contrast, estimates an analytical model that characterizes the underlying face subspace induced by the algorithm and builds a linear transformation from the original template to this global manifold. In addition, the present method does not place any restrictions on the distribution of scores in the training set such as separation between match score distribution and non-match score distribution. The face recognition algorithm to be modeled is treated as a complete black box.

Figure 1:
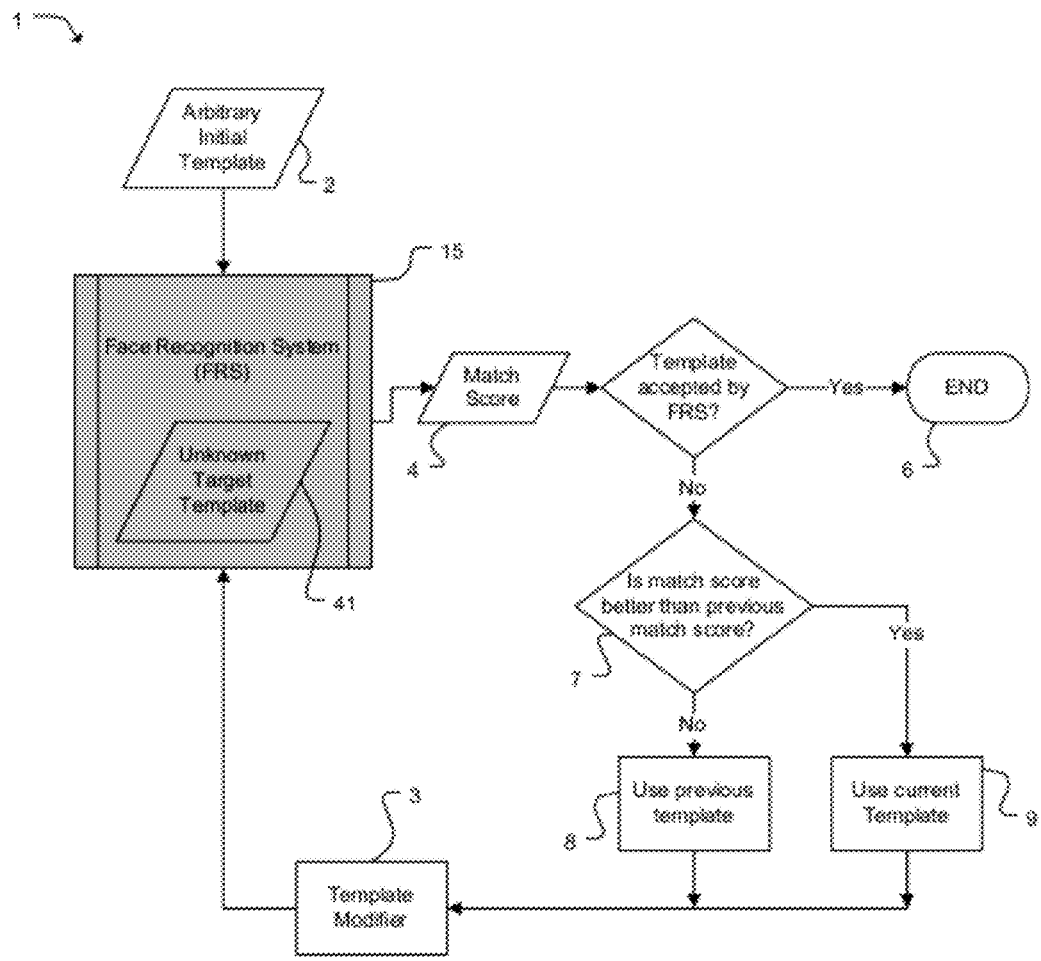
FIG. 1 is a block diagram of the hill climbing approach, a prior art method. The hill climbing attack is an iterative process that starts from a face template and then iteratively updates the template until the template is accepted by the system.
Figure 2:
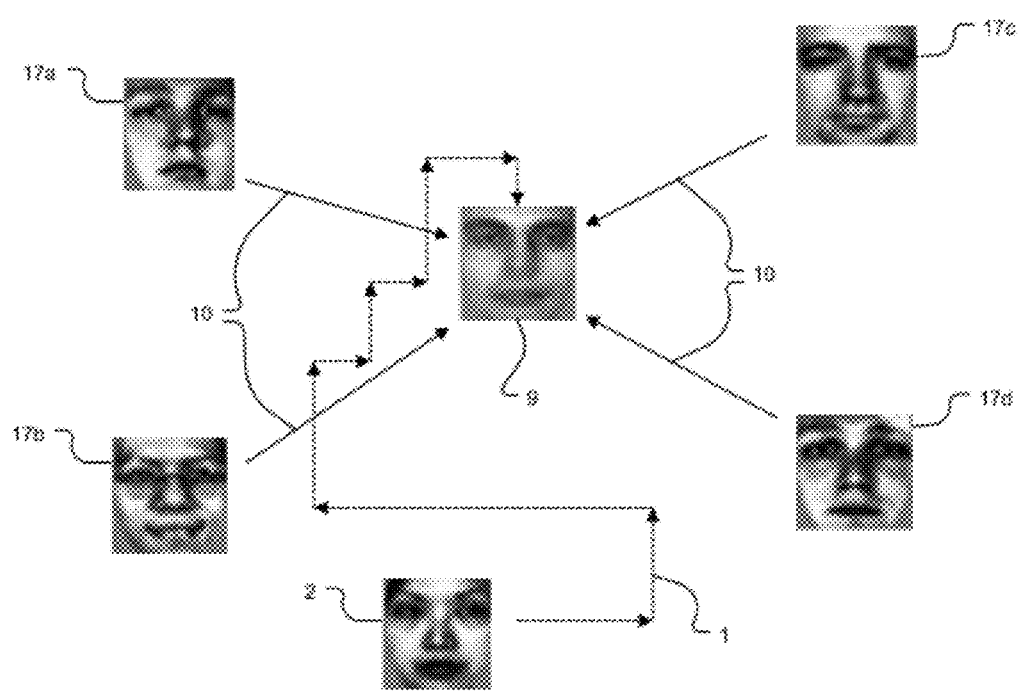
FIG. 2 is a visualization comparing the search process of a hill climbing attack and a reconstruction method. The dotted line represents a possible path in a hill climbing attack starting from a chosen template. At each point on the path, the distance to the template is needed. The solid arrow represents a one-time comparison of templates of the targeted subject with members of the break-in set templates that is needed by the reconstruction method.
Figure 3:
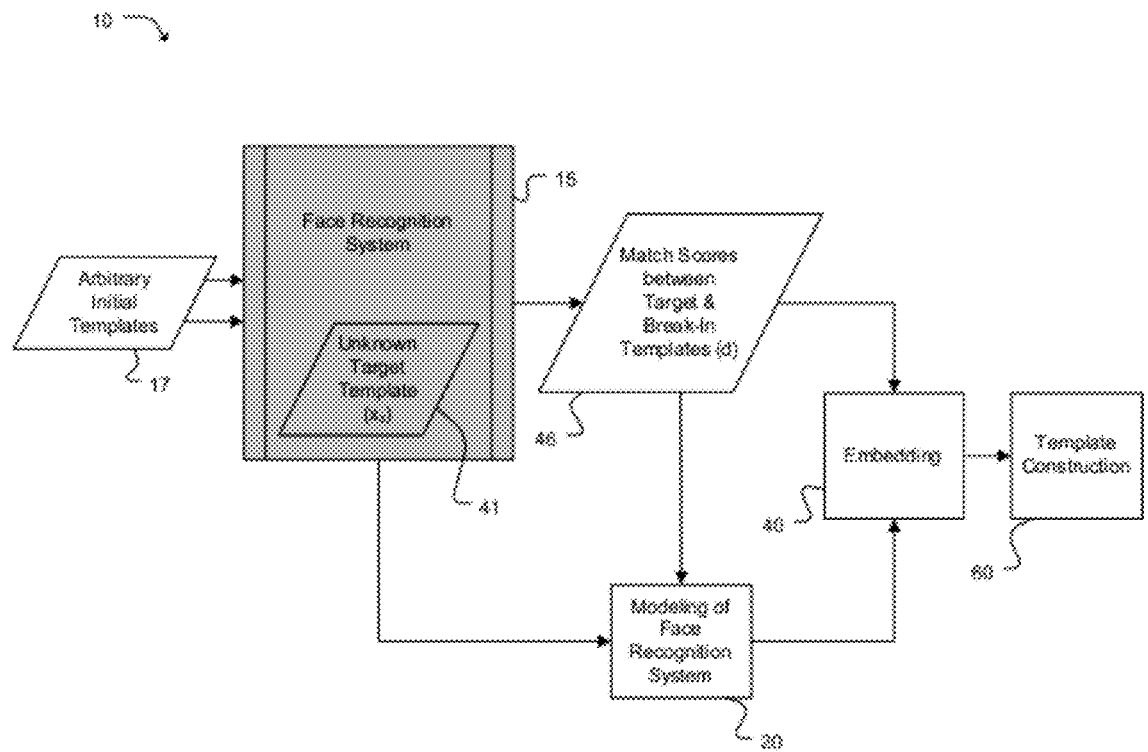
FIG. 3 is a simplified block diagram of the reconstruction method, which uses match score to reconstruct unknown face templates. The method is a model-based approach and employs multiple face templates—the break-in set.

Previous works also briefly introduced reconstruction method 10, as shown in FIG. 3 and showed that given such a method, it can be used to reconstruct face templates from match scores. However, the conclusions were contingent on the ability to construct a linear model. This was demonstrated only for three different face recognition algorithms. The present invention focuses on modeling process 20 of reconstruction method 10. A novel, two-fold method for building linear models has been developed and is presented here. This two-fold method is more sophisticated than the single pass method presented previously. The two-fold method uses iterative stress minimization using a majorization to minimize the error between algorithmic distance and model distance. The output of the classical multidimensional scaling (MDS) initializes this iterative process. The two-fold methods help to build better, generalizable models. The models are better even if the training set used for the face recognition and that used to learn the linear models are different. The empirical conclusions are also based on a more extensive study of six different recognition algorithms.

The present invention also includes an application to indexing of face templates. This novel indexing method results in a reduction in face template comparisons.

Figure 4A:
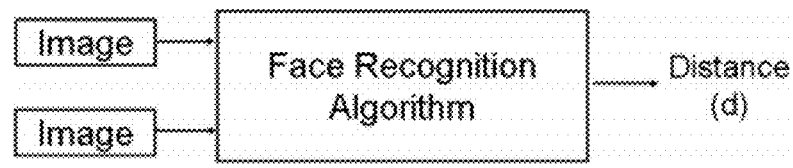
FIG. 4A is diagram showing the distance between two face images observed by a original face recognition algorithm
Figure 4B:
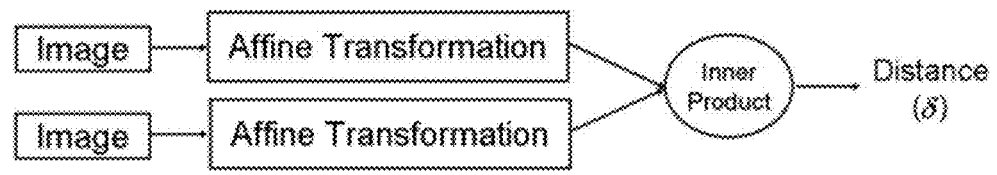
FIG. 4B is a diagram showing the distance between two face images observed by a linear model.

Just as linear systems theory allows the characterization of a system based on inputs and outputs, it was found that a face recognition algorithm can also be categorized based on the distances (the "outputs") computed between two faces (the "inputs"). A diagram of the modeling problem solved by the present invention is shown in FIG. 4A. The present method solves the problem by modeling the distances, $d_{ij}$ computed by any given face recognition algorithm, as a function of the given face images, $x_i$ and $x_j$, which is represented mathematically, by a function $\phi$, such that $(d_{ij}-\|\phi(x_i)-\phi(x_j)\|)^2$ is minimized In particular, affine transforms, as shown in FIG. 4B, were used, as they provide the simplest model. The affine model proved to suffice for a number of face recognition algorithms. Essentially, the present method finds a subspace that approximates the face recognition algorithm. The transformation allows for the embedding of a new template, not used for training, into this subspace. Providing a linear subspace approximation has a number of benefits. First, a subspace approximation allows for the characterization of face recognition algorithms at a deeper level than just comparing recognition rates. For instance, if $\phi$ is an identity operator, then it would suggest that the underlying face recognition algorithm is essentially performing a rigid rotation and translation to the face representations similar to principal component analysis (PCA). If $\phi$ is a linear operator, then it would suggest that the underlying algorithms can be approximated fairly well by a linear transformation (rotation, shear, stretch) of the face representations. Given training samples, the objective of the present invention is to approximate the subspace induced by a face recognition algorithm from pair-wise relation between two given face templates. It has been demonstrated experimentally that the modeling method of the present invention works well for template based algorithms as well as feature-based algorithms. In practice, it was found that a linear $\phi$ is sufficient to approximate a number of face recognition algorithms, even feature-based ones.

Second, a linear approximation can used to reconstruct face templates just from scores. This ability was demonstrated by P. Mohanty et al. in "From scores to face templates: a model-based approach". This has serious security and privacy implications.

Third, the linear subspace approximation of face recognition algorithms can be used to build efficient indexing mechanisms for face images. This is particularly important for the identification scenarios where one has to perform one to many matches, especially using a computationally expensive face recognition algorithm. The model-based indexing method of the present invention has several advantages over the two-pass indexing method presented previously. In a two-pass indexing method, a linear projection such as PCA is used to select a few gallery images followed by the identification of the probe image within the selected gallery images. However, the performance of this type of system is limited by the performance of the linear projection method even in the presence of a high performing recognition algorithm in the second pass. Whereas the use of linear model of the original algorithm ensures the selection of few gallery images that match those computed by the original algorithm. The advantage of the present model-based indexing method over the PCA-based modeling method has been experimentally demonstrated using two different face recognition algorithms with more than 1,000 subjects in the gallery set.

Figure 5A:
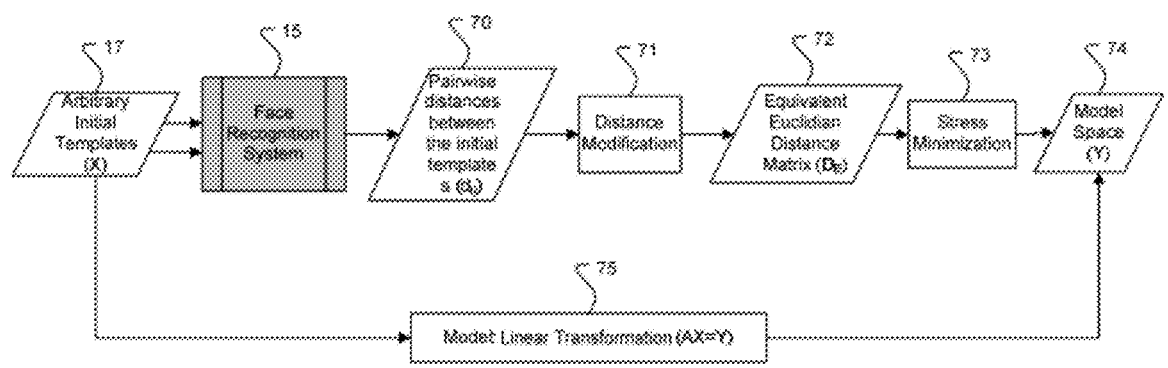
FIG. 5A is a generalized diagram demonstrating the modeling of a Face Recognition Algorithm with a linear transformation.

$\phi$'s that are affine transformations were considered, defining a linear subspace model spanned by, possibly non-orthogonal, vectors. A simplified diagram of the modeling method is shown in FIG. 5A. The face recognition algorithm (contained in FRS 15) being modeled is treated as a black box. For computational reasons, linear model 75 is decomposed into two parts: a rigid transformation, which can be obtained by any orthogonal subspace approximation of the rigid model, such as PCA; and a non-rigid, affine transformation. Note that the basis of the overall transformation need not be orthonormal.

To arrive at model 75 a set of face images (break-in set 17) are input into FRS 15, which computes distances between these face images 70 using the unknown algorithm. These distances are contained in a matrix D, which undergoes a distance modification in operation 71 to produce an equivalent Euclidean distance matrix $D_E$ 72. Equivalent Euclidean distance matrix $D_E$ 72 then embedded in model space 74 by undergoing a stress minimization using iterative majorization initialized by classical MDS in operation 73. This process results in a set of coordinates for break-in set 17. The affine transformation defines the relationship between these embedded coordinates and the rigid (PCA) space coordinates.

Modeling Process

Figure 5B:
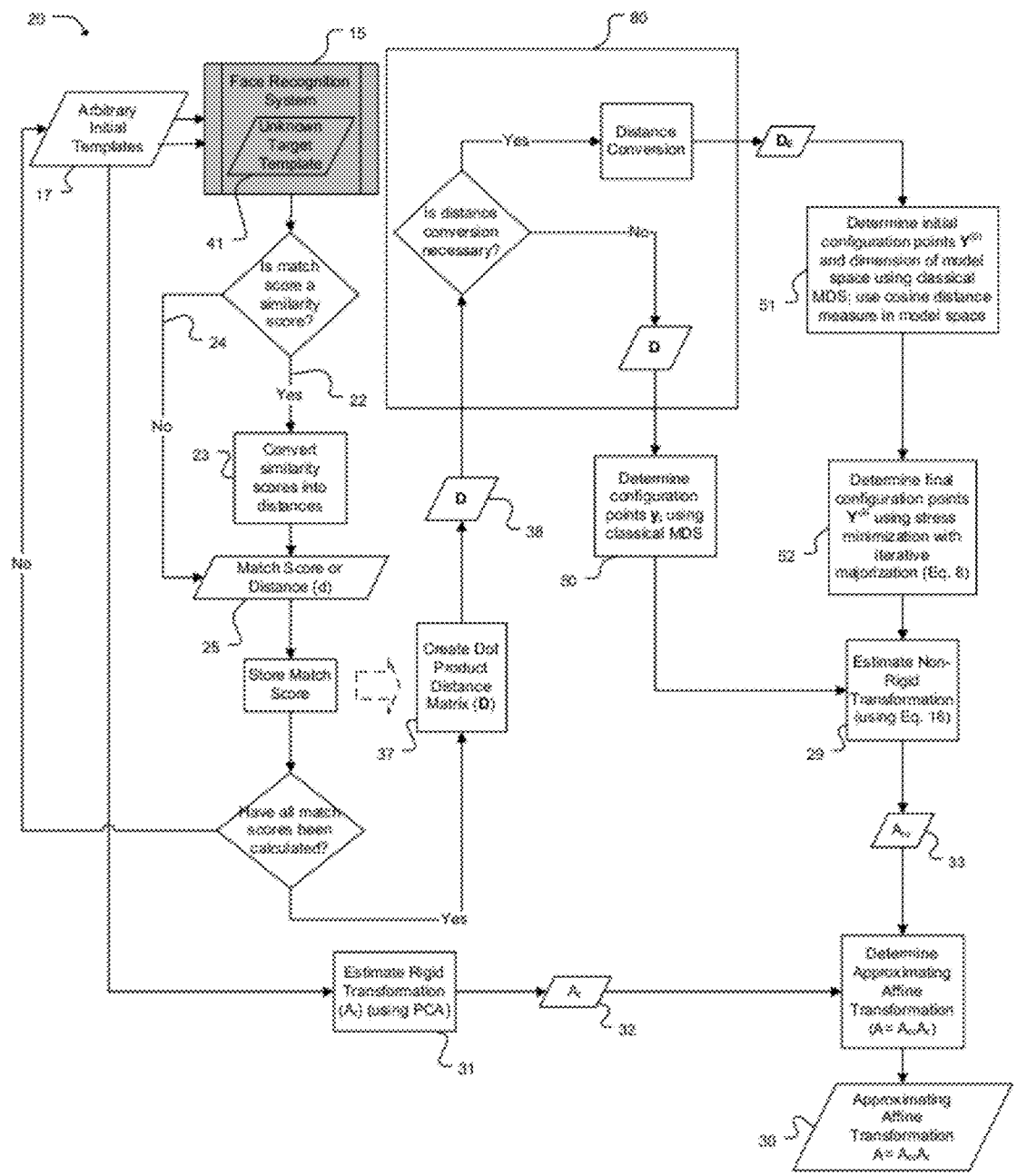
FIG. 5B is a detailed flowchart of the linear modeling method in accordance with an embodiment of the present invention.

Modeling process 20, illustrated in detail in FIG. 5B, is used to model the face recognition algorithm of FRS 15 using approximating affine transformation 30. The inversion of this transformation is then used by embedding process 40 (of FIG. 3) and template construction process 60 (of FIG. 3) to reconstruct unknown target template 41. The inputs to FRS 15 are two distinct face templates $x_i$ and $x_j$ selected from break-in set 17 and the output is a match score or distance d 25 between the two templates.

Typically, a face recognition algorithm of an FRS transforms the given image into a point in a low-dimensional space and then performs a distance measure on this model space. This low-dimensional space is usually constructed by statistical methods such as PCA, linear discriminant analysis (LDA), or independent component analysis (ICA) or constructed out of low-level features detected in the images, such as in the elastic bunch graph matching approach.

The face recognition algorithm of FRS 15 is unknown to modeling process 20. Modeling process 20 models a face recognition algorithm, even feature-based ones, by an affine transformation. Modeling process 20 finds approximating affine transformation 30 by combining orthogonal (or rigid) transformation 32 and non-rigid (shear and stretch) transformation 33 transformation. Rigid portion 32 is estimated in operation 31 by any analysis that computes an orthonormal subspace from break-in set 17, such as PCA. Non-rigid portion 33 of transformation 30 enhances performance of modeling process 20. Approximating affine transformation 30 preserves distances 25 among templates 17 generated by FRS 15. Any template can be embedded in space 30 based on its distance d 25 from a known set of templates, break-in set 17.

Modeling process 20 must determine approximating affine transformation A 30 such that when given images $x_i$'s, are transformed to affine space 30, the euclidean distance between the transformed coordinates of the images are similar to the distances computed by FRS 15. In this notation, $x_i$'s are N-dimensional row-scanned representations of the images, and affine transformation A 30 has dimensions M×N, with M<N.

(Herein, matrices are denoted by bold capital letters A and column vectors by bold small letters a. The identity matrix is denoted by I, a vector of ones by 1, a vector of zeros by 0, and the transpose of A by $A^T$.)

Modeling Process Creation of Dot Product Distance Matrix D $d_{ij}$ represents the distance between two image templates of break in set 17 $x_i$ and $x_j$, ($x_i^T \in \mathfrak{R}^N$) as computed by FRS 15. To create the dot product distance matrix D in operation 37, the distances $d_{ij}$ are arranged as a K×K matrix $D=[d_{ij}^2]$, where K is the number of images in break-in set 17.

This process assumes that FRS 15 outputs dissimilarity scores 24 of the two templates. However, if FRS 15 computes similarities 22, the similarity scores $s_{ij}$ can be converted 23 into distances using a variety of transformations, such as $(1-s_{ij})$, $-\log(s_{ij})$, and $$\frac{1}{s_{ij}} - 1.$$

Modeling Process Metric Distance Conversion

For some recognition algorithms, the observed dissimilarity matrix D 38 may not exhibit metric properties. In such cases, distance matrix D 38 must undergo metric distance conversion. A distance measure d is called a metric if it satisfies the following properties:

1. $d(x, y)=0$ iff $x=y$ (reflexive).
2. $d(x, y) \geq 0$ $\forall x \neq y$ (positivity).
3. $d(x, y)=d(y, x)$ (symmetry).
4. $d(x, y) \leq d(x, z)+d(z, y)$ (triangle inequality).

First, examine each of the metric properties more closely on D. Two different templates with little variation always produce a nonzero dissimilarity. Therefore, it can be assumed that the reflexive and positivity properties always hold unless small scores are forcefully suppressed to zero. Even if the scores are rounded off to the nearest number or small scores are suppressed to zero, as long as there is not a sparse distance matrix with few positive entries, an embedding in the model space can be found that can approximate the distance matrix D. Further, the positivity property can be imparted with a simple translation of dissimilarities values to a positive range. Second, if the distance matrix D violates the symmetric property, then this property can be reinstated by replacing D with $\frac{1}{2}(D+D^T)$. Although this simple solution will change the performance of the algorithm, this correction can be viewed as a first-cut fix for the modeling transformation to the algorithms that violates symmetric property of match scores.

Third, if the dissimilarity measure does not satisfy the symmetry and triangle inequality property, if required, then these properties can be imparted if a set of pair-wise distances arranged in complete distance matrix is available.

Any given dissimilarity matrix D may violate the metric property and may not be a Euclidean matrix, i.e. a matrix of distances that violates the triangle inequality. However, if D is not a Euclidean distance matrix, then it is possible to derive an equivalent Euclidean distance matrix $D_E$ from D. This process is described below.

Modeling Process Euclidean Distance Conversion

Figure 6:
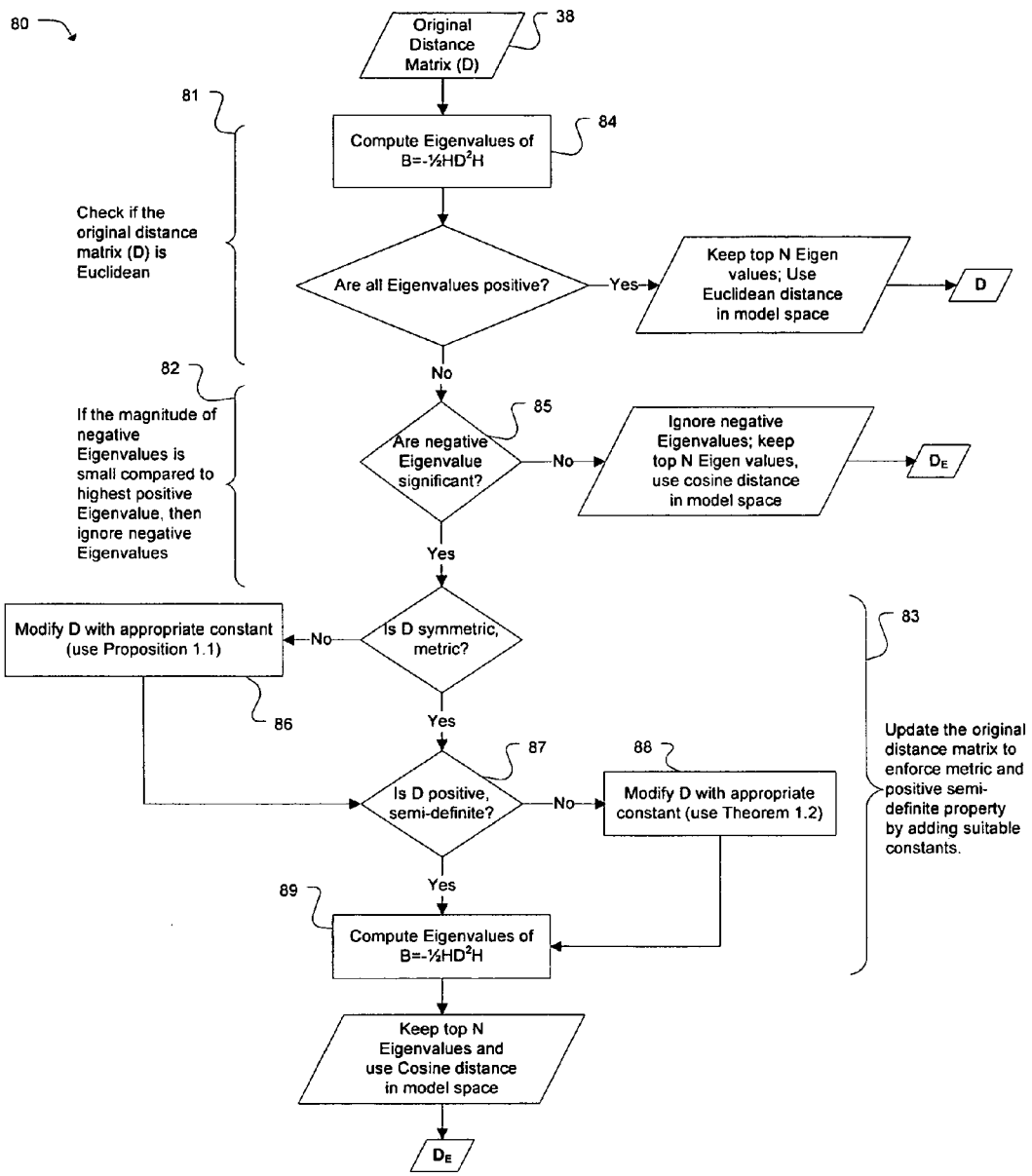
FIG. 6 is a flowchart of the method of modifying the original distance matrix in accordance with an embodiment of the present invention.

The flow chart in FIG. 6 is divided into three blocks (81, 82, and 83), which are demarcated by curly braces with comments.

In first block 81, the original dissimilarity matrix D or a similarity matrix converted to dissimilarity matrix with a suitable function, is tested for the Euclidean property. First, the Eigenvalues of D must be computed in operation 84. If all Eigenvalues are positive, then the top N Eigen values are kept. It also can be inferred that the face recognition algorithm uses Euclidean distance as the distance measure, so, in this particular case, the Euclidean distance measure can be used in the model space as well.

In many cases, the dissimilarity matrix D may not be euclidean. If the original dissimilarity matrix D is not Euclidean (all Eigenvalues are not positive), then, in blocks 82 and 83, those properties of the euclidean distance matrix that are violated by D must be found and those properties reinforced by deriving an approximated Euclidean distance matrix $D_E$ from D. At this point, the distance measure used by the original algorithm is unknown but it is known that the original distance matrix is not Euclidean, so cosine distance measure is consistently used for such model spaces.

If the Eigenvalues of D are not all positive, then it is determined, in operation 85, if the negative Eigenvalues are significant. If the negative Eigenvalues are not significant, then approximated Euclidean distance matrix $D_E$ is obtained by ignoring the negative eigenvalues and keeping the top N Eigen values.

If the negative Eigenvalue are found to be significant in operation 85, then matrix D must consist of distances that are metric. If matrix D is not metric, then D is modified, in operation 86, with an appropriate constant using the following proposition:

Proposition 1.1: If D is non-metric then the matrix $[d_{rs}+c]$; ($r \neq s$) is metric where $c \geq \max_{i,j,k} |d_{ij}+d_{ik}-d_{jk}|$.

If D was metric or, once D has been modified according to proposition 1.1, then it must be determined, in operation 87, if D is positive and semi-definite. If not, then D is modified, in operation 88, with an appropriate constant according to the following theorem:

Theorem 1.2: If $D=[d_{ij}^2]$ is a metric distance, then there exists a constant h such that the matrix with elements $$(d_{ij} + h)^{\frac{1}{2}}, i \neq j$$

is Euclidean, where $h \geq -\lambda_n$, is the smallest (negative) eigenvalue of $$\frac{1}{2} HDH, \text{ where } H = \left(I - \frac{1}{K} 11^T\right).$$

Once D is positive and semi-definite, the eigenvalues are computed again in operation 89 and the approximated Euclidean distance matrix $D_E$ is obtained by keeping the top N Eigen values.

The dimension of the model space is determined by computing the eigenvalues of the matrix $$\frac{1}{2} HDH$$

defined in Theorem 1.2. The eigen-spectrum of the matrix $$\frac{1}{2} HDH$$

provides an approximation to the dimension of the projected space. The dimension of the model space is decided in a more conventional way of neglecting smaller eigenvalues and keeping 99% of the energy of the eigen-spectrum of B. In the presence of negative eigenvalues with high magnitude, Pekalaska and Duin suggested a new embedding method of the data points in pseudo-Euclidean space whose dimension is decided by both positive and negative eigenvalues of high magnitudes. E. Pekalska and P. W. Duin, *The Dissimilarity Representation for Pattern Recognition: Foundations and Applications,* 1st ed., ser. Series in Machine Perception and Artificial Intelligence. World Scientific, vol. 64 (2006). However, because in this case, the original distance matrix has been modified to enforce the Euclidean property, there are not large magnitude negative eigenvalues in the modified distance matrix.

Modeling Process Determining Configuration Points

Given a set of face images (break-in set 17) and the pairwise distances between these images (contained in matrix D 38), a point configuration is computed in which these pairwise distances between the projected points on the low-dimensional subspace are preserved.

Once it has been determined whether a distance conversion was necessary in block 80 of FIG. 5B, then the configuration points must be determined If it is determined, in block 80, that distance conversion was not necessary, then, in operation 50, classical MDS, as discussed below, will be used to determine the configuration points $y_i$. In this case, classical MDS at the very first iteration will result the best configuration points $y_i$. Any subsequent iterative process using stress minimization (as also discussed below) will not result in any improvement and can be skipped.

If it was determined, in block 80, that the distance conversion was necessary, then, in operation 52, stress minimization with iterative majorization is used to arrive at a point configuration. Stress minimization with iterative majorization is described in more detail below. Iterative majorization is will converge to an optimal point configuration, or, in some cases, settle down to a point configuration contributing to a local maxima. However, in either case, an informative initial guess will reduce the number of iterations and speed up the process.

Here, iterative majorization was initialized with a set of configuration points) $Y^{(0)}$ derived, in operation 51, by applying classical MDS on the approximate euclidean distance matrix $D_E$. The method of classical multidimensional scaling used was adapted from Cox and Cox. T. Cox and M. Cox, *Multidimensional Scaling,* 2nd ed. Chapman and Hall (1994).

Modeling Process Determining Configuration Points—Stress Minimization with Iterative Majorization The objective is to find a point configuration $Y=[y_1, y_2, \ldots, y_K]$ such that the squared error in distances $\Sigma(d_{ij}-\delta_{ij})^2$ is minimized, where $d_{ij}$ is the distance computed between face template $x_i$ and $x_j$ and $\delta_{ij}$ is the Euclidean distance between configuration points $y_i$ and $y_j$. Thus, the objective function can be written as $$\min \sum_{i \leq j} w_{ij}(d_{ij} - \delta_{ij})^2 \qquad (1)$$

where, $w_{ij}$ are weights. The incorporation of weights $w_{ij}$ in Eq. 1 is a generalization of the objective function and can be associated with the confidence in the dissimilarities $d_{ij}$. For missing values of $d_{ij}$, the corresponding weights $w_{ij}$ are set to zero. In the experiments, the weights are all equal and set to 1. However, for generality, the theory was developed based on weighted scores. Let, $$S(Y) = \sum_{i<j} w_{ij}(d_{ij} - \delta_{ij})^2 \qquad (2)$$

$$= \sum_{i<j} w_{ij} d_{ij}^2 + \sum_{i<j} w_{ij} \delta_{ij}^2 - 2\sum_{i<j} w_{ij} d_{ij} \delta_{ij}$$

$$= \eta_d^2 + \eta^2(Y) - 2\rho(Y)$$

where, $\eta_d^2$ is independent of the point configuration Y and $$\eta^2(Y) = \sum_{i<j} w_{ij}(y_i - y_j)^T(y_i - y_j) \qquad (3)$$

$$= tr(YVY^T)$$

where, $v_{i,j} = -w_{i,j}$ for $i \neq j$ and $$v_{ij} = \sum_{j=1, j \neq i}^{n} w_{ij}.$$

Similarly, $$\rho(Y) = \sum_{i<j} \frac{w_{ij} d_{ij}}{\delta_{ij}} \delta_{ij}^2 \qquad (4)$$

$$= \sum_{i<j} \frac{w_{ij} d_{ij}}{\delta_{ij}} (y_i - y_j)^T(y_i - y_j)$$

$$= Tr(YU(Y)(Y^T)$$

where, $[U(Y)] = [u_{i,j}]$ and $$u_{ij} = \begin{cases} \dfrac{-w_{ij}d_{ij}}{\delta_{ij}} & \text{if } d \neq 0 \text{ and } i \neq j \\ 0 & \text{otherwise} \end{cases}$$

$$u_{ij} = \sum_{j=1, j \neq i} u_{ij}$$

Hence, from Eqn. 2, $$S(Y) = \eta_d^2 + Tr(YVY^T) - 2Tr(YU(Y)Y^T) \quad (5)$$

The configuration points Y can be found by maximizing S(Y) in many different ways. Here, the iterative majorization algorithm proposed by Borg and Groenen was considered. I. Borg and P. Groenen, *Modern Multidimensional Scaling*. Springer Series in Statistics, Springer, (1997). Let, $$T(Y;Z) = \eta_d^2 + Tr(TVY^T) - 2Tr(YU(Z)Z^T) \quad (6)$$

then $T \geq S$ and $T(Y,Y) = S(Y)$, hence $T(Y,Z)$ majorizes $S(Y)$. So the optimal set of configuration points Y can be found as follows $$\frac{\delta T}{\sigma Z} = 0$$

$$2VY - 2U(Z)Z^T = 0$$

(7)

Thus, the iterative formula to arrive at the optimal configuration points can be written as follows $$Y^{(k)} = V^\dagger U(Y^{(k-1)})(Y^{(k-1)})^T \quad (8)$$

where, $Y^{(0)}$ is the initial configuration points and $V^\dagger$ represent the pseudo-inverse of V.

Modeling Process Determining Configuration Points—Initial Point—MDS

Given the equivalent Euclidean distance matrix $D_E$, here the objective is to find K vectors, $\{y_1, \ldots, y_K\}$ such that $$D_E(i,j) = (y_i - y_j)^T(y_i - y_j) \quad (9)$$

Eq. 9 can be compactly represented in matrix form as $$D_E = c \cdot 1^T + 1 \cdot c^T - 2Y^T Y \quad (10)$$

where Y is matrix constructed using the vectors $y_i$ as the columns $Y = [y_1, \ldots, y_K]$ and c is a column vector of the magnitudes of the vectors $y_i$'s. Thus, $$c = [y_1^T y_1, \ldots, y_K^T y_K]^T \quad (11)$$

Note that the above configuration points $y_i$'s are not unique. Any translation or rotation of vectors $y_i$'s can also be a solution to Eq. 9. To reduce such degrees of freedom of the solution set, constrain the solution set of vectors to be centered at the origin and the sum of the vectors to zero, i.e. $\Sigma_i y_i = 0$. To simplify Eq. 10, pre- and post-multiply each side of the equation by centering matrix $H = (I_i - 1K11T)$, which gives $$B = -\frac{1}{2} H D_E H = Y^T Y \quad (12)$$

Because $D_E$ is Euclidean matrix, the matrix B is represents the inner product between the vectors, $y_i$, and is a symmetric, positive semi-definite matrix. Solving Eq. 12 yields the initial configuration points as $$Y^{(0)} = (V^M_{EVD} \Delta^{M \, 1/2}_{EVD})^T$$

(13)

where $\Delta^M_{EVD}$ is a M×M diagonal matrix consisting of M nonzero eigenvalues of B and $V^M_{EVD}$ represents the corresponding eigenvectors of B.

Modeling Process Determining the Approximating Affine Transformation

So far, it has been shown how to find a set of coordinates, $Y^{(n)}$, such that the Euclidean distance between these coordinates is related to the distances computed by the recognition algorithm by an additive constant. An affine transformation, A, is now found that will relate these coordinates, Y, to the images, X, such that $$Y^{(n)} = A(X - \mu) \quad (14)$$

where μ is the mean of the images in training set, i.e. average face. This transformation is not restricted to be orthonormal or rigid. A is considered to be composed of two sub-transformations: non-rigid transformation $A_{nr}$ and rigid transformation rigid, $A_r$, i.e., $A = A_{nr} A_r$. The rigid part $A_r$ can be arrived at by any analysis that computes an orthonormal subspace from the given set of training images. In this experiment, PCA is used for the rigid transformation. Let the PCA coordinates corresponding to the non-zero eigenvalues, i.e. non-null subspace, be denoted by $X_r = A_r(X - \mu)$. The non-rigid transformation, $A_{nr}$, relates these rigid coordinates, $X_r$ to the distance based coordinates, Y. From Eq. 14

$$Y^{(n)} = A_{nr} X_r \quad (15)$$

Multiplying both sides of Eq. 15 by $X_r^T$ and using the result that $X_r X_r^T = \Lambda_{PCA}$, where $\Lambda_{PCA}$ is the diagonal matrix with the non-zero eigenvalues computed by PCA, gives $$A_{nr} = Y^{(n)} X_r^T \Lambda_{PCA}^{-1} \quad (16)$$

This non-rigid transformation allows for shear and stress, and the rigid transformation, computed by PCA, together model the face recognition algorithm. Note that the rigid transformation is not dependent on the face recognition algorithm; it is only the non-rigid part that is determined by the distances computed by the recognition algorithm. An alternative viewpoint could be that the non-rigid transformation captures the difference between a PCA recognition algorithm.

Modeling Process Summary of Method

Input: a break-in set containing K face images

Determine the dissimilarity/Similarity matrix D computed on the training using the face recognition algorithm Check if D is Euclidean and, if necessary, convert to an equivalent Euclidean distance matrix $D_E$.

Compute initial configuration points $Y^{(0)}$

Use the iterative method in Eq. 8 to arrive at the final configuration points. The iteration is terminated when the error S(Y) is less than the tolerance parameter $\epsilon$, which is empirically set to 0.001 in these experiments.

Compute the rigid sub-transformation $A_r$ using PCA on training set.

Compute the non-rigid sub-transformation $A_{nr}$, as shown in Eq. 16.

$A = A_r A_{nr}$ is the required model affine transformation.

Verification—Experimental Setup

The accuracy of the present linear modeling method was evaluated using six fundamentally different face recognition algorithms and recognition performances of each of these algorithms was compared with corresponding models. The consistency of the linear modeling method was demonstrated on FERET face data sets. The following provides more details about the face recognition algorithms and the distance measures associated with these algorithms, the train sets, and the test sets used in the experiments and the metrics used to evaluate the strength of the purposed modeling method.

Experimental results, presented below, validate that the present linear modeling method generalizes across probe sets representing different variations in face images (FERET probe sets). It is also demonstrated that different distance measures coupled with the PCA algorithm, and normalization of match scores, have minimal impact on the present modeling approach.

Verification—Experimental Setup: Data Sets

The FERET data set, used in this experiment, is publicly available and equipped with pre-defined training, gallery, and probe sets commonly used to evaluate face recognition algorithms. The FERET data set contains 1,196 distinct subjects in the gallery set. A subset of the FRGC training set containing 600 images from the first 150 subjects (increasing order of id) was used to train the present model. This data set was collected at a later date, at a different site, and with different subjects than FERET. Thus, there is a strong separation of train and test set.

Verification—Experimental Setup: Face Recognition Algorithms & Distance Transformation The present modeling method was evaluated with four different template-based algorithms and two feature-based face recognition algorithms. The template-based approaches include (PCA), Independent Component Analysis (ICA), Linear Discriminant Analysis (LDA), and Bayesian Intrapersonal/Extrapersonal Classifier (BAY). Note that the BAY algorithm employs two subspaces to compute the distance. A proprietary algorithm (PRP) and Elastic Bunch Graph Matching (EBGM) algorithm were selected to represent the feature-based recognition algorithms. All of the face images used in this experiment, except for EBGM algorithm, were normalized geometrically using the Colorado State University (CSU) Face Identification Evaluation System to have the same eye location, the same size (150×130) and similar intensity distribution. The EBGM algorithm requires a special normalization process for face images that is manually very intensive. So, the training set that is provided with the CSU data set was used to train the model for the EBGM algorithm. This training set is part of the FERET data set, but different from the probe set used in the experiments.

The six face recognition algorithms and the distance measures associated with each of these algorithms are summarized in the table in FIG. 7. Except for the proprietary and the ICA algorithms, the implementation of all other algorithms are publicly available at Colorado State University (CSU) Face Identification Evaluation System. The implementation of the ICA algorithm has been adapted from M. Bartlett. *Face Image Analysis by Unsupervised Learning*, Kluwer Academic Publishers (2001). The particular distance measures for each of these algorithms are selected due to their higher recognition rates compared to other possible choices of distance measures. The last two columns in the table in FIG. 7 indicate the range of the similarity/dissimilarity scores of the corresponding algorithms and the transformation used to convert these scores to a range such that the lower range of all the transformed distances are the same (i.e. the distance between two similar face images are close to 0). The distance measure for the Bayesian Intrapersonal/Extrapersonal Classifier is a probability measure but due to the numerical challenges associated with small probability values, the distances are computed as the approximations to such probabilities. In addition to the above transformations, the distance between two exact images is set to zero in order to maintain the reflexive property of the distance measure. All of the above-mentioned distance measures also exhibit the symmetric property; thus, no further transformation is required to enforce the symmetric property of the distance measure.

Verification—Experimental Setup: Train and Test Sets

With the exception of the proprietary algorithm, all of the algorithms require a set of face images for the algorithm training process. This training set is different from the training set required to model the individual algorithms. Therefore, two training sets are defined; an algorithm train set (algo-train) and a model train set (model-train). A set of 600 controlled images from 150 subjects (in the decreasing order of their numeric id) from the FRGC training set was used to train the individual algorithms (algo-train). To build the linear model for each algorithm, another subset of the FRGC training set with 600 controlled images from the first 150 subjects (in the increasing order of their numeric id) with four images per subjects (model-train) was used. Due to limited number of subjects in the FRGC training set, few subjects appear in both the training sets; however, there are no common images in algo-train and model-train set. The feature-based EBGM algorithm differs from other algorithms with a special normalization and localization process of face images and requires manual landmark points on the training images. This process is susceptible to errors and needs to be done carefully. So, instead of creating custom ground truth features on a new data set for the EBGM algorithm, the FERET training set containing 493 images provided in the CSU face evaluation system including the special normalized images required for EBGM algorithm was used. The algo-train and the model-train for EBGM algorithm are the same.

The proprietary algorithm does not require any training images. However, while building a model for the proprietary algorithm, it was empirically observed that the performance of the linear model demonstrates higher accuracy on the FERET probe sets when the model is trained (model-train) on the FERET training set. In the result section below, the performance of the linear model with the proprietary algorithm with these two different model-train sets is demonstrated.

To be consistent with other studies, for test sets, the gallery set and four different probe sets as defined in the FERET data set were selected. The gallery set contains 1,196 face images of 1,196 subjects with neutral or minimal facial expression and with frontal illumination. Four sets of probe images (fb, fc, dupI, dupII) were created to verify the recognition performance under four different variations of face images. If the model is correct, the algorithm and model performances should match for all of these probe conditions. The 'fb' set contains 1,195 images from 1,195 subjects with different facial expression than gallery images. The 'fc' set contains 194 images from 194 subjects with different illumination conditions. Both 'fb' and 'fc' images are captured at the same time as that of gallery images. However, 722 images from 243 subjects in probe set 'dupI' are captured between 0 to 1,031 days after the gallery images were captured. Probe set 'dupII' is a subset of probe set 'dupI' containing 234 images from 75 subjects, which were captured at least one and a half year after the gallery images. The above-mentioned numbers of images in probe and gallery sets are pre-defined within the FERET distribution.

Verification—Experimental Setup: Performance Measures to Evaluate the Linear Model The recognition rates of the algorithms were compared with recognition rates of the linear models in terms of standard Receiver Operating Characteristic (ROC). Given the context of biometrics, this is a more appropriate performance measure than the error in individual distances. How close is the performance of the linear model to that of the actual algorithm on image sets that are different from the train set?

In addition to comparison of ROC curves, the Error in Modeling measure was used to quantify the accuracy of the model at a particular False Acceptance Rate (FAR). The Error in the modeling was computed by comparing the True Positive Rate (TPR) of the linear model with the TPR of the original algorithm at a particular False Positive Rate (FAR).

$$\text{Error in Modeling (\%)} = \frac{\text{abs}(TPR_{orig} - TPR_{model})}{\max(TPR_{orig}, TPR_{model})} \times 100 \quad (17)$$

where, TPRorig and TPRmodel are the true positive rate of the original algorithm and true positive rate of the model at a particular FAR.

The approximating linear manifold, a stronger metric, Nearest Neighbor Agreement, was examined to quantify the local neighborhood similarity of face images in approximating subspace with the original algorithm. For a given probe $P_k$, let $G_i$ be the nearest subject as computed by the algorithm and $G_j$ be the nearest subject based on the linear model. Let, $$s_k(G_i, G_j) = \begin{cases} 1 & \text{if } 1 = j \\ 0 & \text{otherwise} \end{cases}$$

Then the nearest neighbor agreement between the model and the original algorithms is quantified as $$S = \left(\frac{1}{P}\sum_{k=1}^{P} s_k\right) \times 100$$

where P is the total number of probes in the probe set. Note that the Nearest Neighbor Agreement metric S is a stronger metric than rank 1 identification rate in Cumulative Match Curves (CMCs). Two algorithms can have the same rank 1 identification but the Nearest Neighbor Agreement can be low. For the later to be high, the identities of both the correct and incorrect matches should agree. In other words, a high value of this measure indicates that the model and the original algorithm agree on neighborhood structure of the face manifold.

Verification—Results

Presented here are the experimental results of the present linear method applied to the six different face recognition algorithms using the FERET probe sets. Using the metrics defined in previous section, the strength of the linear model on FERET data set is demonstrated with complete separation of training and test sets. The experimental results show that the average Error in Modeling for six algorithms is 6.3% for the fafb probe set, which contains a maximum number of subjects among all the four probe sets. It was also observed that the present linear model exhibits an average of 87% accuracy when measured for the similar neighborhood relationship with the original algorithm. A detailed analysis and explanation of these results is presented in the following sub-sections.

Verification—Results: Recognition Performances

Performance of each for the six face recognition algorithms was demonstrated in a series of plots, which are not reproduced here. From these plots, it could be seen that the ROC's matched closely. Not only the recognition performance of the model matched with that of the original algorithm, but it also generalized to the variations in face images represented by the different probe sets. For example, the performance of ICA algorithm in fafc was lower as compared to the rest of the algorithms and the modeling performance was also lower for the ICA algorithm which was a good indication of an accurate model of the underlying algorithm. Similar performances was also observed in the cases of LDA and BAY algorithms. This is evidence of the generalizability of the learnt model across different conditions.

Also, for fafb probe set, the error in the modeling of all the algorithms at 0.001 FAR are 3.8%, 7%, 9%, 5%, 4% and 26% for PCA, LDA, ICA, BAY, EBGM and PRP algorithms, respectively. The high error rate for the PRP algorithm indicates that the linear model for PRP algorithm is under-trained. Note that, the training set used for the proprietary algorithm or the score normalization techniques adapted to optimize the performances are unknown. The performance of the PRP algorithm on four FERET probe sets and the performance of the linear model trained using the FERET training set were also determined. With the FERET training set, the Error in modeling for PRP algorithm in fa-fb probe set is reduced to 13%, and with the normalization process, the error in modeling for the proprietary algorithm is further reduced to 9%. The effect of score normalization on the present modeling method is discussed below.

Verification—Results: Local Manifold Structure

Figures 9, 10:
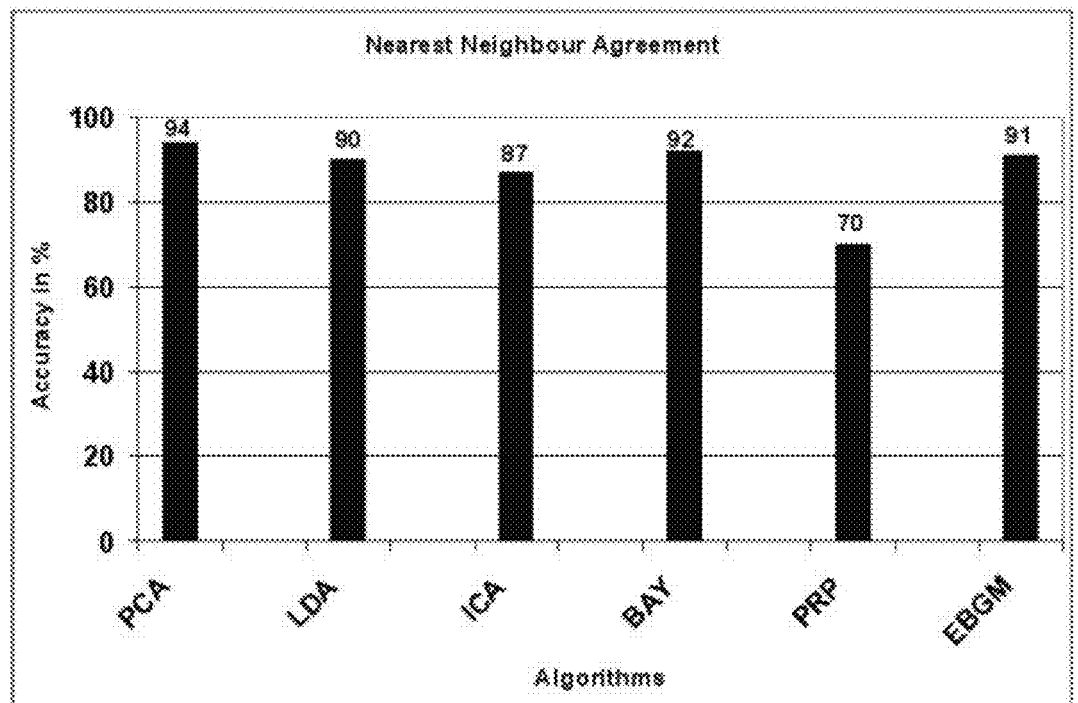
FIG. 9 is a bar graph showing the similarity of the local manifold structure between the original algorithm and the linear model as captured by the nearest neighbor agreement metric using the FERET fafb probe set. The number of times the algorithm and model agree on subjects irrespective of genuine or imposter match are shown in percentage. Note that, this metric is a stronger measure than the rank-1 identification rate in CMC analysis.
FIG. 10 is a table summarizing the error in modeling for PCA algorithm on the FERET fafb (1195 subjects) probe set.

FIG. 9 shows the similarity of the neighborhood relationship for six different algorithms on the FERET fafb probe set. Observe that, irrespective of correct or incorrect match, the Nearest Neighbor Agreement metric has an average accuracy of 87% on all of the six algorithms. It is also important to note that, for algorithms where the performance of the model is better than that of the original algorithm, the metric S is penalized for such improvement in the performances, and pulls down the subject agreement values even if the model has better performance than the original algorithm. This is appropriate in the modeling context because the goal is to model the algorithm not necessarily to better it. The high value of such a stringent metric validates the strength of the linear model. Even with little information about the train and optimization process of the proprietary algorithm, the linear model still exhibits a 70% nearest neighborhood accuracy for the proprietary algorithm.

Verification—Results: Effect of Distance Measures and Score Normalization

Different face recognition algorithms use different distance measures and, in many cases, the distance measure is unknown and non-Euclidean in nature. In order to study the effect of various distance measures on the present modeling method, the PCA algorithm was used with six different distance measures as mentioned in the first column of the table in FIG. 10. For a stronger comparison, all other parameters, such as the training set and dimension of the PCA space, were kept the same; only the distance measure was changed. These distance measures are implemented in the CSU face evaluation tool. In the table of FIG. 10, the Error in Modeling (see Eqn. 17) for the PCA algorithm is presented with different distance measures on the FERET fafb probe set. Note that, as described in FIG. 6, except for PCA+Euclidean distance, the model uses cosine distance for all other cases. From the table, for different distance measures, the Error in Modeling is on the magnitude of $10^{-2}$% or less. Thus, it is apparent that different distance measures have minimal impact on the present modeling method.

Biometric match scores are often augmented with some normalization procedures before compelled to a threshold-based decision. Most of these score normalization techniques are often carried out as a post processing routine and do affect the underlying manifold of the faces as observed by the face recognition algorithms. The most standard score normalization techniques used in biometric applications are Z-normalization and Min-Max normalization. To observe the impact of normalization on the modeling method, the proprietary algorithm was used with min-max and z-normalization techniques. This is over and above any normalization that might exist in the propriety algorithm, about which there was no information available. The normalization methods were applied on impostor scores. Note that, in this case, the normalization techniques are considered as part of the black box algorithm. As a result, the match scores used to train the model are also normalized in the similar way. The recognition performance of the proprietary algorithm with score normalization to that of modeling method were compared. The score normalization process is a post processing method and does not reflect the original manifold of the face images. The same score normalization techniques were applied to match scores of the model. The difference between the algorithm with normalized match score and the model with the same normalization of match scores is small.

An Application: Indexing Face Databases

In the identification scenario, one has to perform one to many matches to identify a new face image (query) among a set of gallery images. In such scenarios, the query image needs to be compared to all the images in the gallery. Consequently, the response time for a single query image is directly proportional to the gallery size. The entire process is computationally expensive for large gallery sets. One possible approach to avoid such expensive computation and to provide faster response time is to index or bin the gallery set. In the case of well-developed biometrics such as fingerprints, a binning process based on ridge patterns such as whorl loop and arches is used for indexing. For other biometrics where a template is represented by a set of d-dimensional numeric features, Mhatre et al. proposed a pyramid indexing technique to index the database. A. Mhatre, S. Palla, S. Chikkerur, and V. Govindaraju, "Efficient search and retrieval in biometric databases," *SPIE Defense and Security Symposium*, vol. 5779, pp. 265-273 (2005). Unfortunately, for face images, there is no straightforward and global solution to bin or index face images. As different algorithms use different strategies to compute the template or features from face images, a global indexing strategy is not feasible for face images. For example, Bayesian intra/extra class approach computes the difference image of the probe template with all the gallery templates; a feature based indexing method is not applicable for this algorithm.

In the present indexing method, the linear modeling method, as described above, is used to model a face recognition algorithm and the linear model is then used to perform binning or an algorithm-specific indexing task, with little or no overhead in computation. A probe image is then projected into the linear model space and the k-nearest gallery images are determined. Then the original face recognition algorithm is used to match the k-selected gallery image with probe image and output the rank of the probe image. Note that, for a perfect indexing, a system with indexing and without indexing will produce the same top-k subjects. A linear projection method, such as PCA, is an example of such first pass pruning method.

The recognition performance of the original algorithm should be better than the first pass linear projection method. Otherwise, the use of a computationally expensive algorithm in the second pass is redundant. Also, if the performance of the first pass algorithm is significantly less than the original algorithm, then the k-gallery images selected by the linear algorithm may not include the nearest gallery images to the probe images as observed by the original algorithm. In this case, the overall identification rate of the system will fall. To minimize this error, the value of k needs to be high, which in turn, reduces the advantages of using an indexing mechanism.

On the other hand, because the linear model approximates the underlying algorithm quite well, it is expected that that basing an indexing method around it should result in a better indexing mechanism. The computation complexity for the modeling method and any other linear projection based indexing method such as PCA is similar, except the training process, which can be done off-line. Of course, for algorithms such as PCA, LDA, and ICA which use the linear projection of raw template, this type of indexing mechanism will result in no additional computational advantage. However, for algorithms such as the Bayesian and EBGM, where numerical indexing of template is not feasible, indexing through a linear model can reduce the overall computational complexity by selecting only a subset of gallery images to be matched with a probe image. In this section, the indexing method of the present invention was demonstrated using the linear method of the present invention and compared with an indexing method based on PCA, coupled with Euclidean distance. The choice of Euclidean distance instead of Mahalanobis distance is to demonstrate the indexing scenario when the first pass linear projection algorithm has lower performance than the original algorithm.

To evaluate the error in the indexing method, the difference in rank values was used for a given probe set with and without the indexing method. If the model extracts the same k nearest gallery image as by the original algorithm, then the rank of a particular probe will not change with the use of the indexing procedure. In such cases, the identification rate at a particular rank will remain the same. However, if the k-nearest gallery subjects selected by the model do not match with the k nearest subjects selected by the original algorithm, then identification rate at a particular rank will decrease. The error in indexing is computed as follows $$E_r = \frac{\max(I_r - \tilde{I})}{I_r}$$

where $E_r$ represents the error in indexing approach at rank r, $I_r$ represents the identification rate of the algorithm at rank r without using indexing of gallery set, and $\tilde{I}_r$ represents the identification rate of the algorithm at rank r using indexing method. Note that, if a probe image has a rank higher than k, then the indexing method is penalized by setting the rank $\tilde{I}_r$ to 0; ensuring highest possible value of $E_r$. The maximum is taken to avoid penalizing the indexing method in cases where indexing of gallery images yields better identification rate than the original algorithm. (e.g. cases where model of an algorithm has a better recognition rate than the original algorithm). In the tables in FIGS. 11 and 12, the values of the indexing parameter k are shown at three different indexing error rates for rank 1 and up to rank 5 identification, using both fafb and dup1 probe set, respectively. These two probe sets in the FERET database have a maximum number of probe subjects compared to other probe sets. The tables in FIGS. 11A and 12A show the value of k with PCA-based two pass indexing method.

For the model-based indexing method, the value of the indexing parameter for the Bayesian algorithm is as low as 8 with error in indexing equals to 0.01%. As a result, with the help of the present indexing method, the Bayesian algorithm requires at most eight comparisons to achieve similar rank-1 performance as compared to using the complete gallery set, which requires 1,195 comparison in the case of the FERET-fafb probe set. Similarly, for the other two algorithms, at most 50 comparisons are sufficient to achieve similar identification performance at 0.01% error rate for rank-1 as well as rank-5 identification performances. With this indexing method, the response time is reduced by a factor of $$\frac{C_a}{C_m} + \frac{k}{N},$$

where $C_a$ and $C_m$ is the time required to match two face images using the original algorithm and its linear model respectively. N represent the number of gallery images. Because the present modeling method requires only a linear projection of face images, in most cases (such as BAY and EBGM algorithms) $C_a \geq C_m$, and $$\frac{C_a}{C_m} + \frac{k}{N} \ll 1.$$

However, for algorithm such as PCA, LDA and ICA which uses the linear projection of raw template, the model will not provide any computational advantage as in these cases $C_a = C_m$.

In case of PCA-based indexing mechanism, a high variation in value of indexing parameter k can be observed. The indexing performance of PCA-based indexing mechanism on FERET fafb probe set for the Bayesian and EBGM algorithm is consistent with that of linear modeling index method. However, in all other cases, particularly in the case of PRP algorithm, the value of k was observed to be very high due to significant performance different between the PCA and the PRP algorithm. Similar values of k are observed even if the Mahalanobis distance is used instead of Euclidean distance for PCA-based indexing method with PRP algorithm as well. For the PRP algorithm on FERET-fafb probe set, the values of k are 2 (5), 48 (52), 198 (199) and 272 (298) for rank-1 and rank-5 error rates respectively, using indexing with PCA with Mahalanobis distance measure as the first pass pruning method. Similarly, FERET-fafb probe set, the values of k are 2 (8), 20 (44), 26(56) and 28 (57) for rank-1 and rank-5 error rates respectively. These results validate the advantages of using a linear model instead of any arbitrary linear projection method for selecting the k-nearest gallery images in the first pass.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A method of modeling an unknown face recognition algorithm, the method comprising:
providing an unknown face recognition algorithm;
providing a training set (X) comprising a plurality of face images;
providing a score matrix (D) containing the scores between pairs of the plurality of face images of the training set produced by the unknown face recognition algorithm, wherein a score is the distance between a pair of the face images;
converting the score matrix (D) to an equivalent Euclidean matrix (DE); and using stress minimization with iterative majorization to determine a set of coordinates for the training set from the equivalent Euclidean matrix (DE).

2. The method of claim 1, wherein the iterative majorization is initialized by classical multidimensional scaling.

3. A method of modeling an unknown face recognition algorithm, the method comprising:
providing an unknown face recognition algorithm;
providing a training set (X) comprising a plurality of face images;
providing a score matrix (D) containing the scores between pairs of the plurality of face images of the training set produced by the unknown face recognition algorithm, wherein a score is the distance between a pair of the face images;
determining if the score matrix (D) is Euclidean;
computing a plurality of optimal configuration points (Y) from the score matrix (D) using classical multidimensional scaling responsive to the score matrix (D) being Euclidean;
converting the score matrix (D) to an equivalent Euclidean matrix (DE) responsive to the score matrix (D) being non-Euclidean; and
computing a plurality of optimal configuration points (Y) from the distances contained in the equivalent Euclidean matrix (DE) using an initial configuration point (Y(0)) and stress minimization with iterative majorization responsive to the creation of the equivalent Euclidean matrix (DE), wherein the initial configuration point (Y(0)) is computed from the equivalent Euclidean matrix (DE) using classical multidimensional scaling.

4. A method of indexing face templates in a recognition system, the recognition system having a recognition algorithm and a plurality of gallery images, the method comprising:
determining a linear model of the recognition system, wherein determining the linear model comprises;
providing an unknown face recognition algorithm;
providing a training set (X) comprising a plurality of face images;
providing a score matrix (D) containing the scores between pairs of the plurality of face images of the training set produced by the unknown face recognition algorithm, wherein a score is the distance between a pair of the face images;
converting the score matrix (D) to an equivalent Euclidean matrix (DE); and using stress minimization with iterative majorization to determine a set of coordinates for the training set from the equivalent Euclidean matrix (DE);
providing a probe face image;
projecting the probe face image into the linear model space; and
determining the nearest gallery images.

5. The method of claim 4, further comprising:
comparing the nearest gallery images with the probe face image using the recognition algorithm; and
outputting the nearest gallery image to the probe face image.

* * * * *